(12) United States Patent
Muratori

(10) Patent No.: US 11,198,203 B2
(45) Date of Patent: Dec. 14, 2021

(54) DEVICE FOR THE MOVEMENT OF PIECES IN A MACHINE TOOL

(71) Applicant: SAMEC S.p.A., Borgo Maggiore (SM)

(72) Inventor: Antonio Muratori, Borgo Maggiore (SM)

(73) Assignee: SAMEC S.P.A., Borgo Maggiore (SM)

( * ) Notice: Subject to any disclaimer, the term of this patent is extended or adjusted under 35 U.S.C. 154(b) by 189 days.

(21) Appl. No.: 16/575,036

(22) Filed: Sep. 18, 2019

(65) Prior Publication Data
US 2020/0086439 A1 Mar. 19, 2020

(30) Foreign Application Priority Data

Sep. 18, 2018 (IT) .......................... 102018000008667

(51) Int. Cl.
*B23Q 7/04* (2006.01)
*B23Q 3/08* (2006.01)

(52) U.S. Cl.
CPC ............. *B23Q 7/046* (2013.01); *B23Q 3/088* (2013.01); *B23Q 2240/002* (2013.01); *B23Q 2703/04* (2013.01)

(58) Field of Classification Search
CPC ............ B23D 47/042; B23Q 2240/002; B23Q 2703/04; B23Q 2705/14; B23Q 3/088; B23Q 7/04; B23Q 7/046; B23Q 7/043; B23Q 7/001; B24B 41/068; B25B 11/005; B28D 7/00; B28D 7/04; B28D 7/043; B28D 7/046; B64G 49/061
See application file for complete search history.

(56) References Cited

U.S. PATENT DOCUMENTS 6,257,564 B1 * 7/2001 Avneri ................. B25B 11/005
269/21

FOREIGN PATENT DOCUMENTS

| EP | 1 219 398 A2 | 7/2002 | |
| EP | 2189400 A1 * | 5/2010 | ............. B24B 47/22 |
| EP | 2 618 974 A1 | 3/2012 | |
| EP | 2492224 A1 | 8/2012 | |
| WO | 2012/038798 A1 | 3/2012 | |

OTHER PUBLICATIONS

Italian Search Report dated May 6, 2019, in corresponding Italian application IT 201800008667.

* cited by examiner

*Primary Examiner* — Tyrone V Hall, Jr.
(74) *Attorney, Agent, or Firm* — Nixon & Vanderhye

(57) ABSTRACT

A device (1) for the movement of sheet-like pieces (P) in a machine tool (M), including a frame (10) moving towards or away from the machining surface (P1) of the machine, a gripping device (20) including a sheet-like element (21) with a gripping surface (21*a*) having openings (24) and mounted on the frame (10) rotatingly around at least one axis (x) substantially orthogonal to the direction of movement (D) of the frame (10) and element for the creation of a vacuum (25) communicating with the openings (24) and adapted to generate a vacuum pressure at the openings (24), which, when the gripping surface (21*a*) is substantially next to the machining surface (P1), makes it possible to detach the pieces (P) from the machining surface and keep them on the gripping surface.

18 Claims, 7 Drawing Sheets

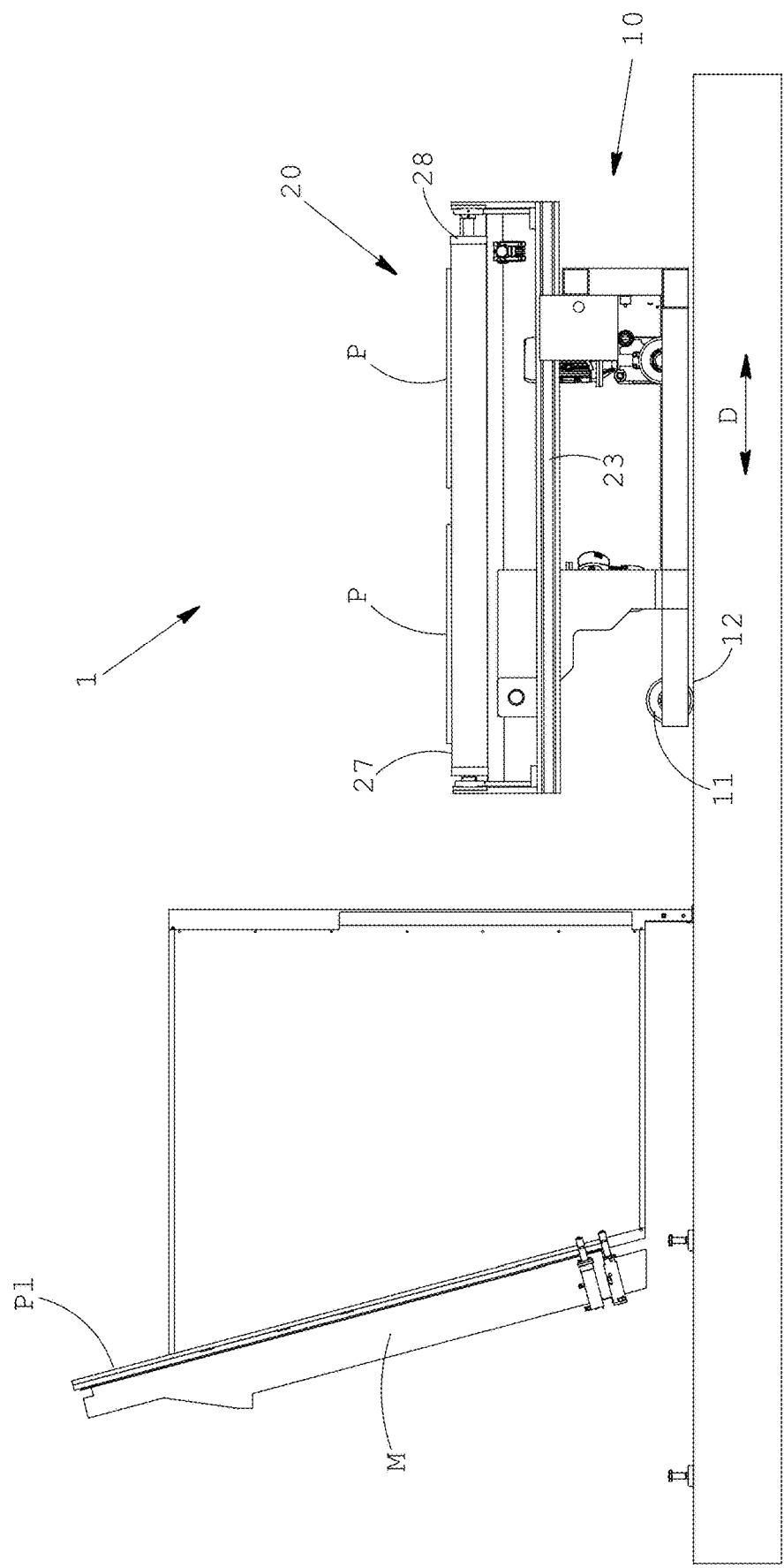

DEVICE FOR THE MOVEMENT OF PIECES IN A MACHINE TOOL

BACKGROUND OF THE INVENTION

Field of the Invention

The present invention refers to a device for moving pieces in a machine tool, namely in a machining centre for processing sheet-like pieces. More in detail, the invention refers to a device adapted to collect processed pieces or swarf from the machining surface of the machine and to arrange them in an area where they can be collected by an operator.

Description of the Related Art

Machining centres named "vertical" because equipped with a substantially vertical, or almost perpendicular to the ground, machining surface are known in the field of machine tools.

Machine tools of this kind are particularly advantageous in certain applications because they allow to obtain a reduced footprint of the machine and at the same time to provide the operator with an excellent accessibility to the machining area.

The machines thus arranged are especially used for processing flat elements, such as panels or sheets, made of different materials such as for example wood, light metals or composite materials.

Machining centres with vertical machining surface comprise, generally, a cross-member, movable between the two opposite sides of the machining surface along a first substantially horizontal direction, and a working head slidingly mounted on said cross-member along a substantially vertical direction. A numerical control unit manages in an accurate and interpolate manner the positioning and the movements of the cross-member and of the working head and, therefore, of the tool.

These machine tools, generally, are equipped with vacuum pressure machining surfaces to lock the piece to be processed in a stable and accurate position.

The loading and placing on the machining surface of the "raw" pieces to be processed are performed by hand by an operator or by means of specific lifting tools arranged on the side of the machine, such as for example the one disclosed in patent no. EP 2492224 B1 of the applicant hereof. Generally, processing on this kind of machines provides to load a single raw piece (panel) at a time, which is processed by milling, boring and, frequently, even cutting operations in order to obtain multiple pieces, mutually identical or different, having smaller dimensions than the original raw piece.

Once said processing is ended, a plurality of pieces, finished or semi-finished, and swarf are left on the machining surface and they must be removed, as quickly as possible, in order to enable the machine to perform new processing.

Currently the collecting or "unloading" of all the processed pieces (swarf included) from the machining surface is performed manually by an operator or by anthropomorphic robots or the like.

In the first case, the operator may need a significant amount of time to free the machining surface, especially if the finished pieces and the swarf are numerous and small sized. On the contrary, when said pieces are large sized, they may be too heavy for being handled safely by a single person.

For the above reasons, in some cases, said machining centres are served by anthropomorphic robots, i.e. of the type comprising at least one articulated arm provided with pneumatic locking means, such as suction cups or the like. Said robots so configured are thus capable to grip a piece from the machining surface, to transport and arrange it in a selected zone within an operating area which can be used by the robot.

Said anthropomorphic robots, even if they are efficient and versatile, show however some drawbacks.

Firstly, their purchase price is significantly high, and it is generally justified only by consistent production volumes of the machining centre.

Furthermore, programming and controlling said robots is quite complex. In fact, such devices, express their maximum potential in performing repeatedly a certain sequence of operations for which they were programmed. To be used in the described scope, i.e. for grabbing and moving certain flat elements from the machining surface of the machine towards an unloading area, for each unloading cycle of the machining surface such programming implies at least that all the pieces (both finished pieces and swarf) to be unloaded and the location of the centroid of each one of them are identified.

In fact, the piece must be grabbed in a limited area around its centroid so to balance the normal and tangential forces to which said gripping means, generally of the suction type, is subject.

Said programming requires the use of a PLC type control unit which must be programmed for each working cycle performed by the machining centre.

Furthermore, the suction gripping means are not always compatible with the shape of the finished pieces or of the swarf, especially if they have a tapered shape, i.e. when one of its two dimensions in plan is particularly small.

Lastly, in consideration of the fact that, generally, an arm of the robot is able to grab only one piece at a time, whenever there are many pieces to collect, also such device requires a rather long time to completely free the machining surface of the machine.

The market knows machining centres differing from those described for their substantially horizontal machining surface. Some of those machining centres, in order to unload the pieces from the machining surface, are provided with a bar connected to the mobile cross-member which can be moved close to the machining surface and used for moving the pieces toward an outlet side of the machining surface.

This system, which is relatively simple and cost-effective, can be however used only on a horizontal machining surface. Furthermore, it implies a sliding of the pieces on the machining surface and, thus, the build-up of scratches and marks on the face facing said surface which, typically, is the one which remains in sight and which must keep appropriate aesthetic properties.

BRIEF SUMMARY OF THE INVENTION

In this context, the object of this invention is to propose a device for the movement of pieces in a machine tool, in particular for unloading pieces from the machining surface of a vertical centre which overcomes the drawbacks of the prior art.

In particular, the object of the invention is to provide a constructively simple device and, thus more cost-effective than the anthropomorphic robots of the prior art.

A further object of this invention is to provide a device which allows to grab and collect multiple pieces from the machining surface of the machine at the same time, in order to free it in the shortest time possible and, therefore, to be immediately able to process a new raw piece, allowing thus to improve productivity.

Moreover, a further object of this invention is to provide a device for the movement of pieces which is simple to program and manage.

A further object of the present invention is to provide a device which is versatile and also able to grab pieces of any dimension without requiring any modification or adaptation.

These objects are achieved by a device as described below, which allows the movement of sheet-like pieces in a machine tool equipped with a vertical or substantially vertical machining surface against which said pieces are blocked during the processing.

Within the scope of this invention, the term "substantially vertical" means, if referring to the position of the machining surface, a position of said surface with an inclination up to around ±20° with respect to a vertical plan.

According to the invention, the device comprises:
- a frame movable at least along one direction, for moving the device towards or away from the machining surface; and
- a gripping device, mounted on the movable frame rotatingly around at least one axis substantially horizontal and orthogonal to the direction of movement of the frame.

According to a preferred embodiment, said gripping means comprises a sheet-like element which has both a gripping surface, adapted to receive and retain the pieces which are arranged on the machining surface of the machine and a plurality of openings which face said gripping surface.

According to a preferred embodiment, the sheet-like element is integrally connected to a support framing, which, in turn, is hinged to the frame.

According to the invention, the device also comprises means for the creation of a vacuum, such as, for example, a vacuum pump or the like, communicating with said openings on the gripping surface.

According to the invention, the sheet-like element is tiltable and shiftable, due, respectively, both to the possibility of rotating around the horizontal axis and to the movement of the movable frame, between a gripping position, in which it is substantially parallel to and in contact with the machining surface of the machine, to an unloading position in which it is at a distance from said machining surface.

Furthermore, according to the invention, said means for the creation of a vacuum are adapted to generate a vacuum pressure at the openings. Said vacuum pressure, when the gripping surface is substantially contacting the machining surface, makes it possible to attract the pieces from said machining surface and keep them on said gripping surface of the sheet-like element.

By adopting a sheet-like element whose dimensions are around equal to those of the machining surface of the machine it is thus possible to collect all the pieces thereon at the same time.

Once the sheet-like element is moved to an unloading position, i.e. sufficiently away from the machining surface, an operator can collect the processed pieces and the swarf from the gripping surface and place them in their provided location. In the meanwhile, the machine, whose machining surface is free, can perform new processing on other raw pieces or in any case on pieces requiring further processing.

Thanks to the so-conceived device, the unloading time of the machine is significantly reduced both if compared to the fully manual operation and also if compared to the use of anthropomorphic robots.

Moreover, the so-conceived device for the movement of pieces is constructively simple, and thus also cost-effective, further than simple to be managed and operated.

According to an aspect of the invention, the movement of the movable frame and the rotation of the sheet-like element are preferably obtained with actuating means such as electric motors, linear motors or the like. Said actuating means are preferably controlled by a control unit provided with manual commands which can be operated by the operator. Alternatively, said actuating means may be directly connected to the control unit of the machine tool and controlled by it.

According to a preferred variant, the movable frame comprises movement means, more in particular rolling or sliding means, such as, for example, wheels, preferably sliding on rails or the like fixed to the floor. In this case the frame linearly moves towards and away the machine tool. The movement can be transmitted by the actuator (motor or the like) to said moving means or said actuator can directly interact with said rails. According to a variant, said means and rails can comprise respective toothing adapted to mutually engage during the movement.

According to an aspect of the invention, the gripping device comprises a lining layer made of a permeable to air material, placed on the gripping surface. Said lining layer allows to distribute the vacuum pressure in an area around said openings, or allows the vacuum pressure to be distributed in a substantially uniform manner on the gripping surface.

Said lining layer may consist of a material selected, for example, among one or more from felt, a traditional fabric, a nonwoven fabric or the like.

According to a possible variant, said lining layer can be in the form of a closed belt, wrapped around the sheet-like element. According to said variant, the device furthermore comprises support rollers, for example arranged at two opposite sides of the sheet-like element, which can turn in contact with the inner surface of the tape so as to make it slide on said sheet-like element.

Preferably, said sides are the shorter sides of the sheet-like element, typically the right and left sides.

According to said configuration, when the device is at the unloading position, said lining layer can be slid, for example by rotating the support rollers, for facilitating the detachment and the unloading of the pieces which are on the gripping surface.

According to another aspect of the invention, each opening is equipped with a valve provided with a movable shutter. Said shutter moves between a closed position, in which it contacts a perimeter edge of said opening, and an open position, in which it is detached from said perimeter edge allowing the passage of air through the opening. The shutter comprises at least one portion that, in the closed position, protrudes from the gripping surface.

When the shutter is in the closed position and the vacuum creation means are active there is no passage of air through the opening. On the contrary, when the shutter is in the open position, it retracts detaching itself from said perimeter edge allowing the passage of a given air flow towards the vacuum creation means.

When the sheet-like element is brought into contact with the machining surface the shutters are pressed and, thus, moved from their closed to open position. In this way they allow the vacuum creation means to generate a vacuum pressure in the area around the opening and for this reason to attract the pieces which are on the machining surface.

When the sheet-like element is detached from the machining surface of the machine, the free shutters, i.e. above which there are no pieces, autonomously return to the closed position. In this way, it is avoided that air is aspirated through said openings which causes dispersions of the vacuum which in turn may cause a reduction of the retention force of the pieces. This allows therefore to optimize the use of the vacuum creation means being it possible to provide the device with smaller vacuum pumps, reducing thus also the electricity consumption.

According to a preferred variant, said valve comprises a hollow bushing with an edge defining said opening. The shutter is placed inside said bushing and is subject to the action of elastic means adapted to keep it in contact with the perimeter edge of the opening in closed position.

The shutter has typically a spherical shape and the shape of the perimeter edge of the opening is circular.

According to another aspect of the invention, the sheet-like element can comprise a light-structure panel which acts both as a supporting element of the pieces and communication means for putting in fluid communication the openings on the gripping surface with the vacuum creation means.

Said panel comprises a first outer layer, a second outer layer and an intermediate layer. The openings in connection with the vacuum creation means are formed in the first outer layer.

The intermediate layer, on the other hand, comprises a plurality of cells delimited by lamellar elements extending between the outer layers. At least one part of said cells are in fluid communication with one another so as to put, in turn, the openings of the first layer in fluid communication. Said communicating cells are typically at least 50% of the total cells of the panel and preferably at least 75% thereof.

According to a preferred embodiment, the lamellar elements of the intermediate layer have holes or grooves which put the different cells in communication, allowing the passage of the air and thus the distribution of the vacuum between them.

In this way, when a vacuum pressure is created within the intermediate layer, said vacuum pressure propagates through the different communicating cells up to the openings located on the gripping surface.

Thanks to said configuration, said openings can be connected to the vacuum creation means without using a piping network, with its related joints and accessories, for reaching each opening.

This makes the device simple and quick to be assembled and, thus, also cost-effective.

According to an embodiment, the panel, at least at one of the sides, comprises a vacuum distribution channel communicating with the cells of the intermediate layer.

Said distribution channel can comprise, for example, a portion of the panel, included between the two outer layers, in which, generally, there is no intermediate layer. Said distribution channel is laterally closed by an outer closing layer. Said lateral edge is preferably sealed so as to ensure the full sealing from the external environment.

According to a preferred variant, all the sides of the panel are provided with lateral closing edges joined to the outer layers so to create, in the intermediate layer, a sealed chamber.

According to the invention, the distribution channels can be more than one and, in such case, they are preferably arranged at the respective sides of the panel.

The vacuum creation means can be therefore put in communication with at least one of the distribution channels, for example by means of a single piping, thus simplifying its vacuum circuit.

According to a preferred embodiment, the first outer layer, the second outer layer and the lamellar elements of the intermediate layer are made of aluminium. Said material guarantees actually both an excellent capability to be processed and an appropriate resistance against the forces caused by the vacuum pressure in the intermediate layer.

BRIEF DESCRIPTION OF THE DRAWINGS

Further characteristics and advantages of this invention will be more apparent from the indicative, and therefore non-limiting, description of an example of a preferred but not exclusive embodiment of the invention, as shown in the accompanying figures wherein:

FIG. 4b is a side section view of the sheet-like element of FIG. 4a;

Figure 1:
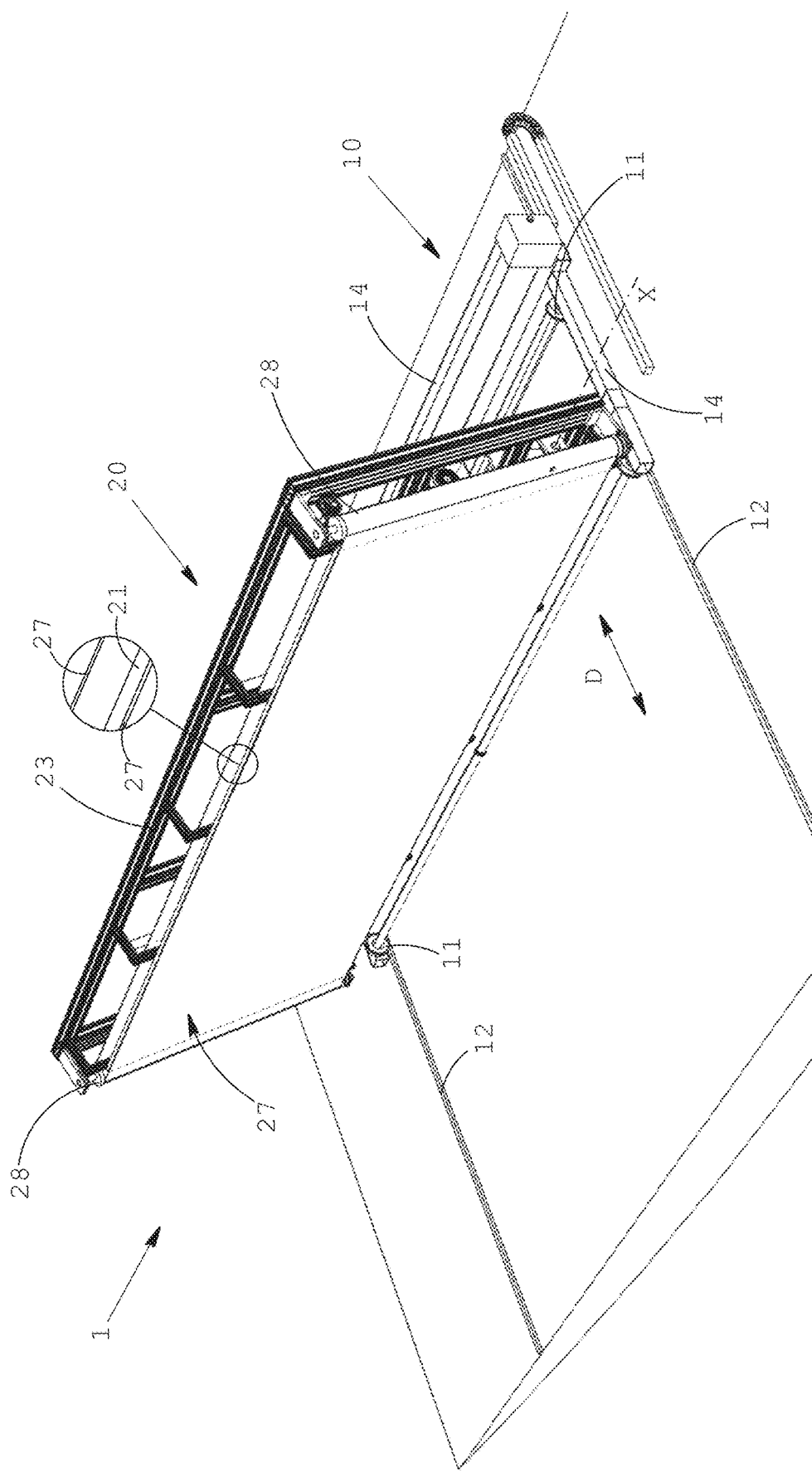
FIG. 1 is a perspective view of the device according to the invention.
Figure 2:
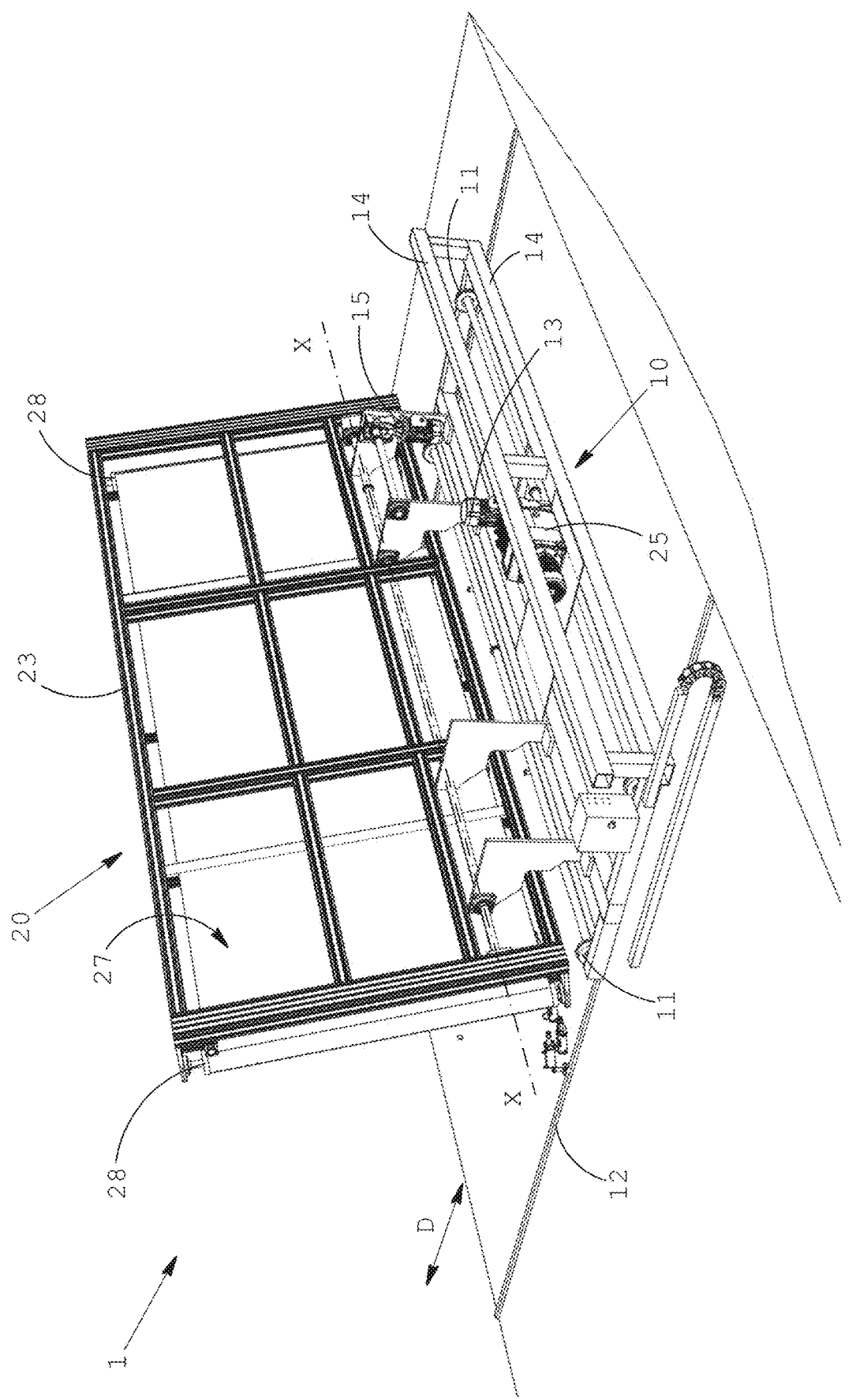
FIG. 2 is a perspective rear view of the device of FIG. 1.
Figure 3:
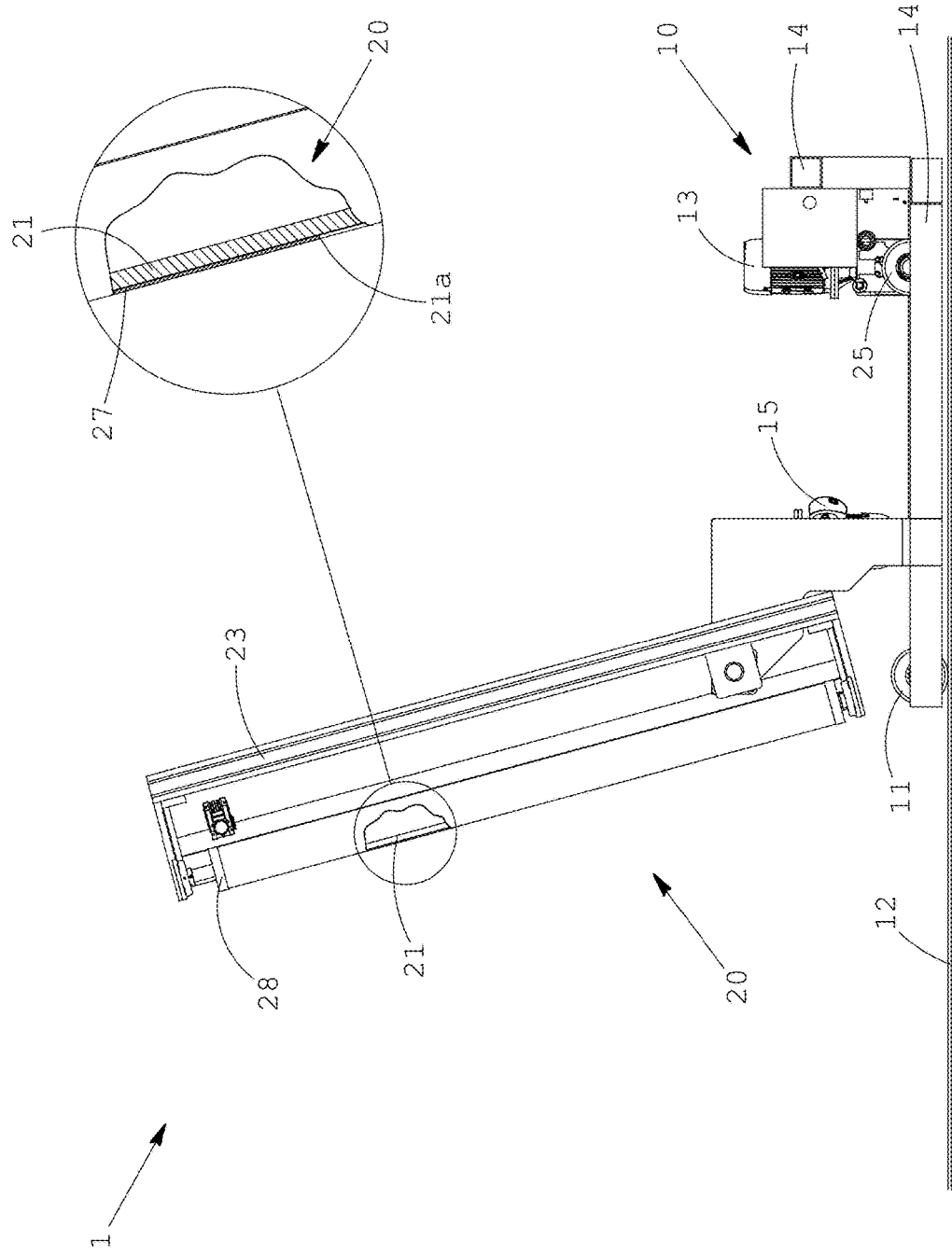
FIG. 3 is a side view of the device of FIG. 1.
Figure 4A:
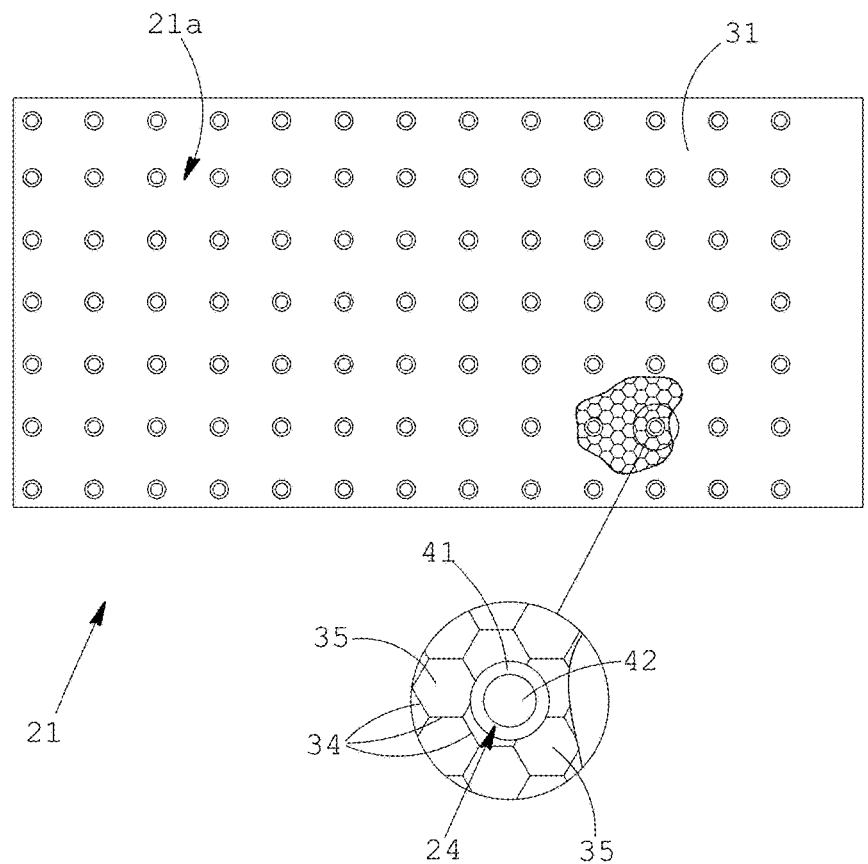
FIG. 4a is a top view of the sheet-like element of the device according to the invention.
Figure 4B:
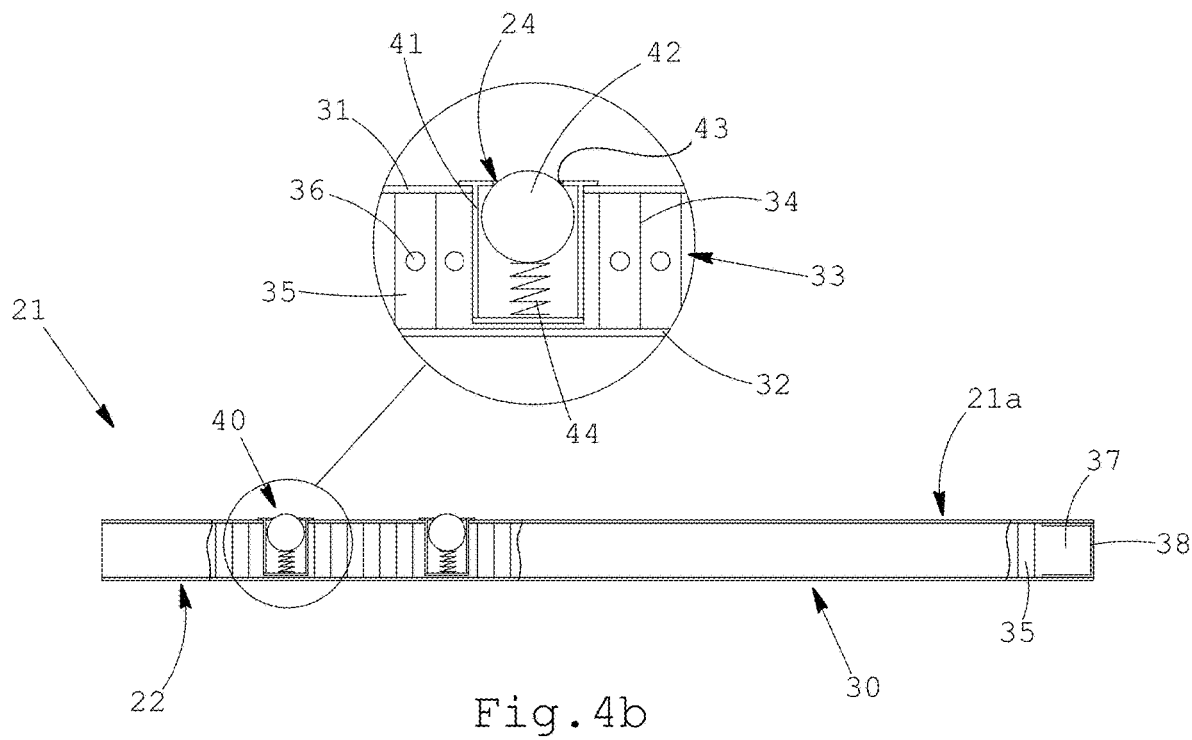

FIGS. from 5 to 7 are side views of the device of FIG. 1 during the collecting stages of pieces from a machine tool.

DETAILED DESCRIPTION OF THE PREFERRED EMBODIMENTS

Figure 5:
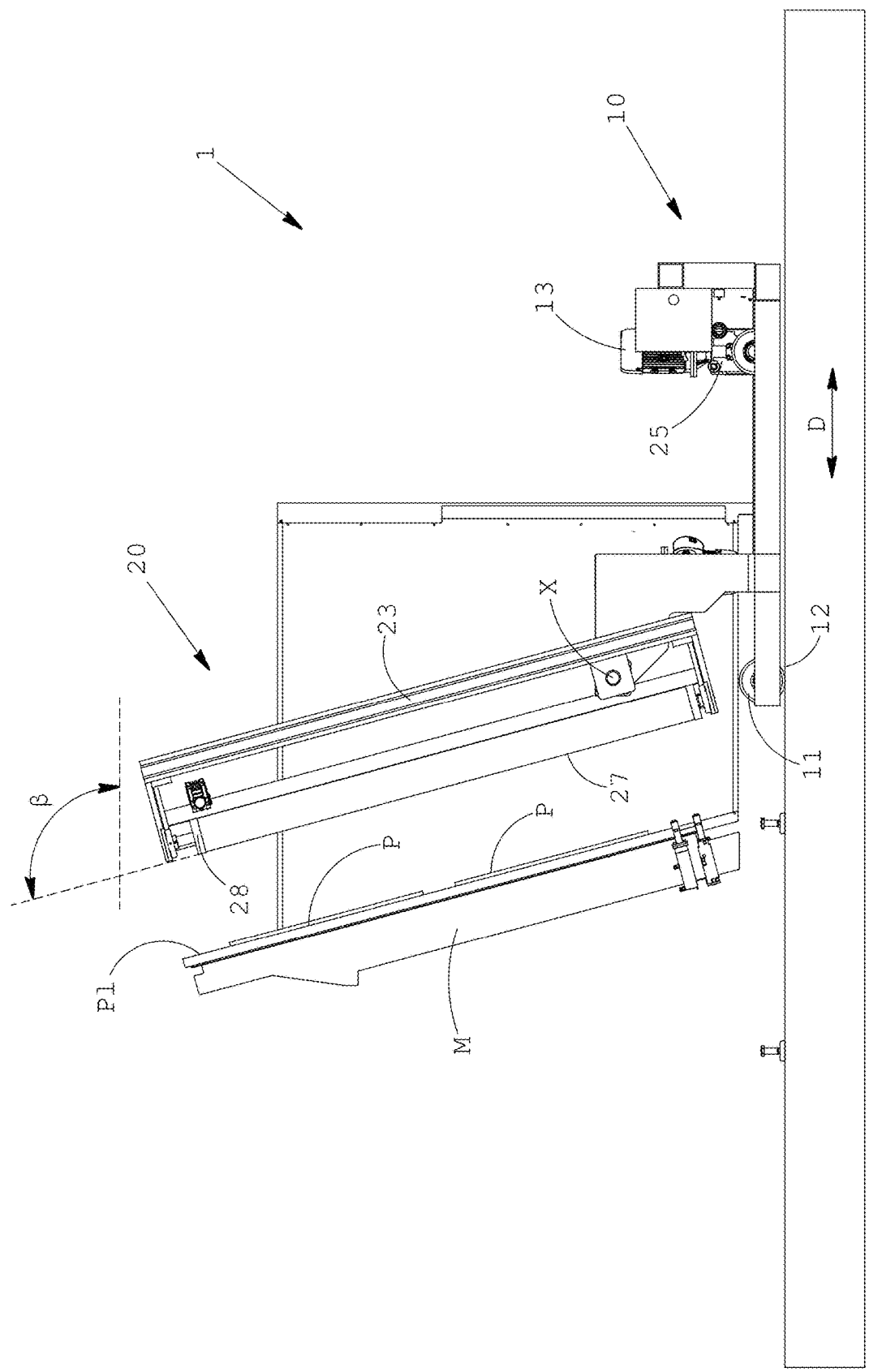
Figure 6:
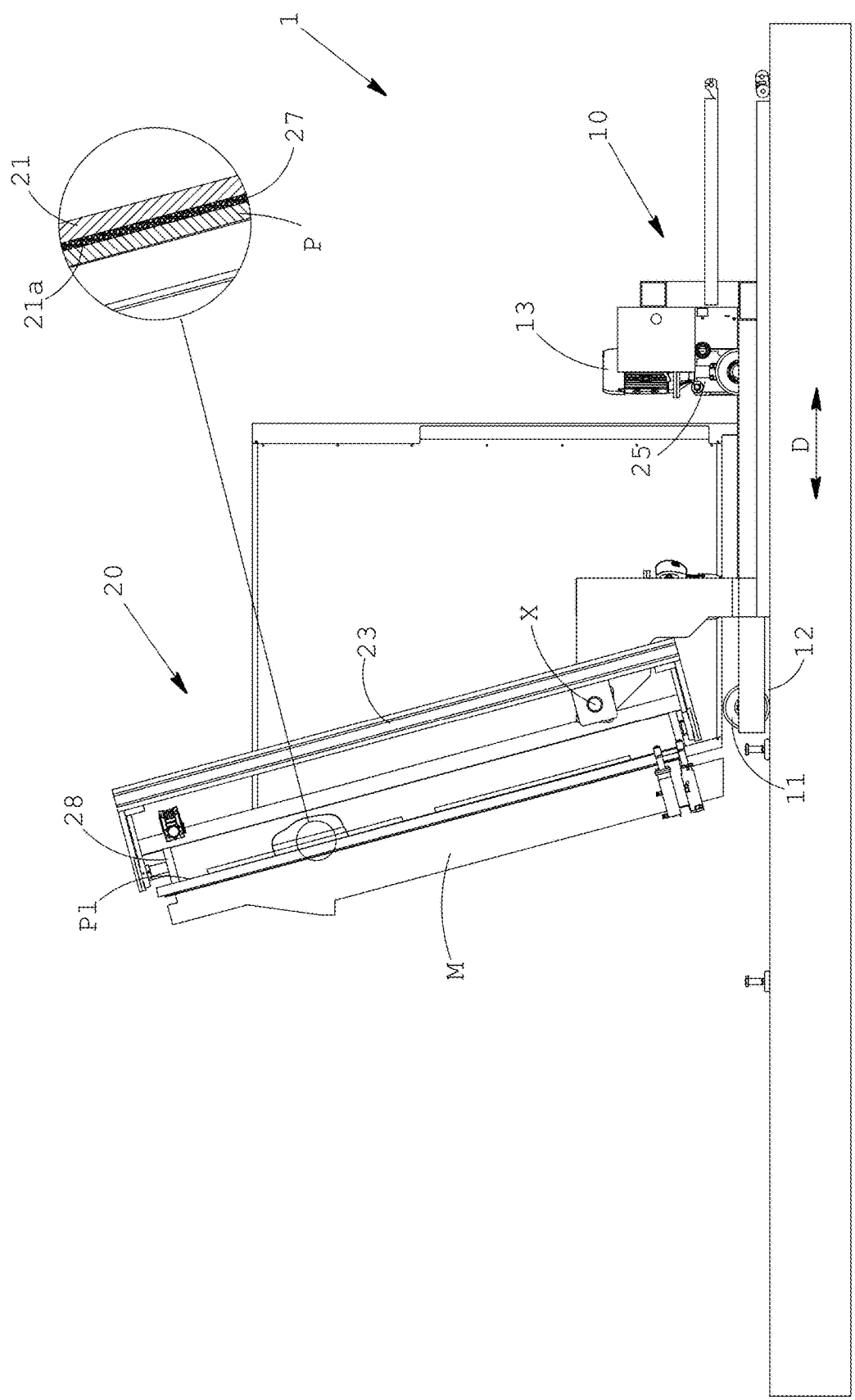

With reference to the accompanying figures, number 1 indicates as a whole the device for moving pieces in a machine tool M, which, in the attached FIGS. 5-7, is schematically depicted as a machining centre provided with a machining surface P1 substantially vertical on which pieces P to be collected and removed are retained.

The device 1 comprises a frame 10 provided with rolling or sliding means 11, preferably wheels, for moving along a direction D towards or away from the machine tool M.

Said wheels 11 are sliding on rails 12 fixed to the ground. The travel of the wheels 11 on the rails 12 is variable in function of the requirements and, typically, is between 1.5 m and 5 m.

A motor 13, or optionally more than one, transfers the motion to one or more of the wheels 11, the latter, generally, are at least four.

The frame 10 can have different shapes and can be built according to different manufacturing techniques. In the shown embodiment, the frame 10 comprises profiles 14 mutually joined by means of welding or bolts. Alternatively, the frame 10 can be built using plates joined to form box-like elements or other technically equivalent solutions.

A gripping device indicated as a whole with reference numeral 20 is connected rotatingly to frame 10. Said gripping device comprises a sheet-like element 21 which can be rotated around an axis X which is substantially horizontal and, preferably, substantially perpendicular to the movement direction D of frame 10.

The rotation of the sheet-like element 21 is driven by a gear motor 15, or by similar actuators.

According to the embodiment in the drawings, the sheet-like element 21 is integrally connected to a support framing 23, which, in turn, is hinged to the frame 10.

The sheet-like element 21 is provided with a front face 21, named gripping face, and a rear face 22. Preferably, the rotation of the sheet-like element 21 is from an unloading position, in which the gripping surface 21a is substantially horizontal and facing upwards (FIG. 7) to a gripping position in which the gripping surface 21a is substantially parallel to the machining surface P1 of the machine M (FIG. 5). Typically, the rotation angle β completed by the sheet-like element 21 is between 90° and 120° and more preferably between 100° and 110°, starting from the unloading position in which the sheet-like element is substantially horizontal. The rotation of the sheet-like element can be managed manually by an operator or automatically by a control unit, not depicted in the drawing.

Preferably, the angular positions of the sheet-like element 21 in their respective unloading and gripping position are pre-set in the device. In this way, also when the rotation is given manually, the gear motor 15 is automatically stopped when the gripping surface 21a is exactly parallel to the machining surface P1 of the machine M, in the gripping position, or when it is horizontal, in the unloading position.

Drawings 4a and 4b show more in detail the sheet-like element according to a preferred embodiment.

Referring to said drawings, the sheet-like element 21 consists of a light structure panel 30 comprising a first outer layer 31, a second outer layer 32 and an intermediate layer 33, made preferably of a honeycomb structure or similar structures. Said intermediate layer 33 comprises then thin lamellar elements 34 which extend between the inner surfaces of the two outer layers 31, 32 and which are shaped so to create a plurality of cells 35.

The panel 30 has typically a quadrilateral plan shape, preferably a rectangle or a square, like most machining surfaces of vertical machining centres or similar machine tools.

The outer surface of the upper layer 31 defines said gripping surface 21; on said surface a plurality of openings 24 are formed which are in communication with a vacuum pump 25. As explained above, the vacuum pressure created by the vacuum pump 25 is transferred up to said openings 24 generating a suction attracting force onto the gripping surface 21a at the openings 24.

According to a preferred embodiment, each opening 25 is provided with a valve 40. In the shown example said valve 40 comprises a bushing 41 in which a mobile shutter 42 is housed, typically shaped as a sphere. The bushing 41 is housed in a seat formed in the intermediate layer 33 and, preferably is completely included in the thickness of the panel 30.

In the closed valve position, the shutter 42 contacts a perimeter edge 43 of the bushing 41, which defines the opening 25 and partially protrudes from the gripping surface 21a. In said position the shutter 42 prevents the passage of air through opening 25. In the open valve position, on the other hand, the shutter 42 is detached from said perimeter edge 43, allowing the passage of air through the opening 24. A spring 44 is mounted on the shutter 42 to keep it pressed against the perimeter edge 43 of the bushing 41, thus in the closed position, with a certain pre-load.

According to a preferred embodiment, in the lamellar elements 34 of the intermediate layer 33 holes 36, grooves or the like which put in fluid communication some or all cells 35 are formed.

Said cells 35 are, in turn, communicating with opening 24, for example through passages formed in the walls of the bushing.

In the shown embodiment, on one side of the panel 30 it is provided a distribution channel 37 communicating with a plurality of cells 35 of the intermediate layer 33. Said distribution channel 37 is defined by the external layers 31, 32 and at least one side closing edge 38. Actually, between the outer layers 31, 32 a blank zone is formed, i.e. a zone in which the intermediate layer 33 which act as distribution channel is not present. The side closing edge 38 is joined to the external layers 31, 32, by means of glues or sealants so to ensure water-tightness. Generally, the extension of the distribution channel 27 is equal to the length of the side of the panel 30 where it is located.

Preferably, all the sides of panel 30 are closed by side closed edges as the one described above, not shown in the drawing, in order to ensure water-tightness around the whole intermediate layer 33. The panel can be optionally provided with multiple distribution channels 37 placed at respective sides of the panel 30.

The distribution channel 37 is used for putting the vacuum pump 25 in communication with multiple cells 35 at the same time and, thus, for distributing uniformly the vacuum pressure generated by said vacuum pump 25 between the different openings 24.

Generally, the vacuum pump 25 is connected to the distribution channel 37 by means of one or more pipes, not shown in the drawings.

According to a preferred embodiment of the invention, the device comprises a lining belt 27, wrapped around the sheet-like element 21. Said lining belt is made of a permeable to air material.

As explained above, the function of said material is to allow that the vacuum pressure generated at the openings 24 is diffused in a wider area and, therefore, in a substantially uniform manner on the whole gripping surface 21a.

The lining belt 27 is wrapped around two rollers 28 placed at two opposite sides of the sheet-like element 21, right and left in the example in the drawing, and connected to the support framing 23.

In the scope of this invention, the terms right and left refer to the sheet-like element 21 of the device 1 in the element is oriented substantially perpendicularly to the ground, as shown in FIG. 1.

Said rollers 28 can be free wheeling, allowing the belt to freely rotating around the sheet-like element 21, or can be motorized. In both cases the rotation of the rollers 28 and of the belt 27 allows to move the pieces collected from the machining surface P1 of the machine tool M towards a side of the panel, facilitating the collection and removal operations by an operator.

Drawings from 5 to 7 show the device during the collection stages of pieces P from the machining surface P1 of a machine tool M.

In FIG. 5 the sheet-like element 21 is rotated by an angle β so to be substantially parallel to the machining surface P1 of machine M.

Frame 10 is thus moved until the belt 27 which covers the sheet-like element 21 is substantially contacting the machining surface P1 or the pieces retained on it, as shown in FIG. 6.

In this stage, following the pressure applied by the machining surface P1 or by the pieces P towards the sheet-like element 21, the protruding portions of the shutters 42 are pushed towards the interior of the bushing 41 moving the shutter away from the perimeter edge 43 and, therefore, by freeing at least partially the opening 24.

The vacuum pump 25, activated in this stage or even before, generates then, at the opening 24, a vacuum pressure which diffuses in a surrounding area through the belt 27. Said vacuum pressure, in turn, generates an attraction force of the various pieces P placed on the machining surface P1.

At this point the frame 10 is moved away from the machine M so that the pieces P are detached from the machining surface P1 and retained by the device against the belt 27. Preferably, at the same time, the gripping means of the machine which retain the pieces on the machining surface are deactivated or, in any case, set in a way that the attraction force of the device for the movement is able to detach all the pieces from the machining surface.

In the zones of the gripping surface 21 where pieces P are not present, the shutters 42 remain in the closed position so that through the respective openings 24 no air is aspirated which may reduce the vacuum pressure value and thus the attraction force on the present pieces.

Once the frame reached an unloading position, the sheet-like element 21 is preferably rotated in a horizontal position, or another position only slightly inclined, in which it allows an operator to unload the pieces P easily and to place them in their provided location, as shown in FIG. 7.

To perform a new collecting operation from said unloading position, the sheet-like element 21 is rotated again in a position parallel to the machining surface P1 (FIG. 5) and the stages described above are repeated.

The invention was described by way of non-limiting example, according to certain preferred embodiments. A person skilled in the art may find several other embodiments and variations, all falling within the scope of protection of the below claims.

The invention claimed is:

1. A device for the movement of sheet-like pieces in a machine tool equipped with a vertical or substantially vertical machining surface against which said pieces are held during processing, said device comprising:
   a frame movable in at least one direction, to move the device towards or away from the machining surface of the machine;
   a gripping device, mounted on the movable frame, the gripping device comprising a sheet-like element defining a gripping surface on which a plurality of openings is defined, said sheet-like element being mounted on the frame rotatingly around at least one axis substantially orthogonal to the direction of movement of the frame;
   a vacuum system configured to create a vacuum communicating with said openings on the gripping surface; and
   a lining layer made from a permeable to air material, disposed on the gripping surface of the sheet-like element, the lining layer configured to distribute vacuum pressure generated by the vacuum in an area around said openings,
   wherein said sheet-like element is configured to be moved from a gripping position in which the sheet-like element is substantially parallel to and in contact with the machining surface of the machine, to an unloading position in which the sheet-like element is at a distance from said machining surface, and
   said vacuum system is configured to generate the vacuum pressure at the openings, which, when the gripping surface is substantially next to the machining surface, enables detaching the pieces from said machining surface and keep the pieces on said gripping surface.

2. The device according to claim 1, wherein the frame comprises a movement system sliding on rails fixed to the ground.

3. The device according to claim 1, wherein said lining layer is a closed belt wrapped around the sheet-like element, said device further comprising, at two opposing sides of the sheet-like element, rollers that turn in contact with an inner surface of the lining layer to make the lining layer slide on said sheet-like element.

4. The device according to claim 1, wherein each of the openings is equipped with a valve provided with a shutter movable between a closed position, in which the shutter contacts a perimeter edge of said opening, and an open position, in which the shutter is detached from said perimeter edge, thereby allowing the passage of air through the opening, said shutter comprising at least one portion that, in the closed position, protrudes from the gripping surface.

5. The device according to claim 4, wherein said valve comprises a bushing comprising said perimeter edge, the shutter being placed inside said bushing and being subject to the action of an elastic device configured to keep the shutter in contact with said perimeter edge of said opening.

6. The device according to claim 5, wherein said shutter has a spherical shape and said perimeter edge has a circular profile.

7. The device according to claim 4, wherein said shutter has a spherical shape and said perimeter edge has a circular profile.

8. The device according to claim 1, wherein said sheet-like element comprises a light-structure panel with
   a first outer layer, defining said gripping surface,
   a second outer layer, and
   an intermediate layer comprising a plurality of cells delimited by lamellar elements extending between said first layer and said second layer, and
   wherein at least one part of said cells are in fluid communication with one another to create, in the intermediate layer, a chamber communicating with the openings.

9. The device according to claim 8, wherein said panel, at least at one side, comprises a vacuum distribution channel communicating with the cells of the intermediate layer, said vacuum system being in fluid communication with said distribution channel.

10. The device according to claim 9, wherein said distribution channel is delimited by the first outer layer, the second outer layer, and at least one side closing edge.

11. A device for the movement of sheet-like pieces in a machine tool equipped with a vertical or substantially vertical machining surface against which said pieces are held during processing, said device comprising:
    a frame movable in at least one direction, to move the device towards or away from the machining surface of the machine;
    a gripping device, mounted on the movable frame, the gripping device comprising a sheet-like element defining a gripping surface on which a plurality of openings is defined, said sheet-like element being mounted on the frame rotatingly around at least one axis substantially orthogonal to the direction of movement of the frame; and
    a vacuum system configured to create a vacuum communicating with said openings on the gripping surface,
    wherein said sheet-like element is configured to be moved from a gripping position in which the sheet-like element is substantially parallel to and in contact with the machining surface of the machine, to an unloading position in which the sheet-like element is at a distance from said machining surface, and
    said vacuum system is configured to generate the vacuum pressure at the openings, which, when the gripping surface is substantially next to the machining surface, enables detaching the pieces from said machining surface and keep the pieces on said gripping surface,
wherein said sheet-like element comprises a light structure panel with
a first outer layer, defining said gripping surface,
a second outer layer, and
an intermediate layer comprising a plurality of cells delimited by lamellar elements extending between said first layer and said second layer, and
wherein at least one part of said cells are in fluid communication with one another to create, in the intermediate layer, a chamber communicating with the openings.

12. The device according to claim 11, wherein said panel, at least at one side, comprises a vacuum distribution channel communicating with the cells of the intermediate layer, said vacuum system being in fluid communication with said distribution channel.

13. The device according to claim 12, wherein said distribution channel is delimited by the first outer layer, the second outer layer, and at least one side closing edge.

14. The device according to claim 11, wherein the frame comprises a movement system sliding on rails fixed to the ground.

15. The device according to claim 11, wherein said lining layer is a closed belt wrapped around the sheet-like element, said device further comprising, at two opposing sides of the sheet-like element, rollers that turn in contact with an inner surface of the lining layer to make the lining layer slide on said sheet-like element.

16. The device according to claim 11, wherein each of the openings is equipped with a valve provided with a shutter movable between a closed position, in which the shutter contacts a perimeter edge of said opening, and an open position, in which the shutter is detached from said perimeter edge, thereby allowing the passage of air through the opening, said shutter comprising at least one portion that, in the closed position, protrudes from the gripping surface.

17. The device according to claim 16, wherein said valve comprises a bushing comprising said perimeter edge, the shutter being placed inside said bushing and being subject to the action of an elastic device configured to keep the shutter in contact with said perimeter edge of said opening.

18. The device according to claim 16, wherein said shutter has a spherical shape and said perimeter edge has a circular profile.

* * * * *